Sept. 2, 1941.  D. BALTUCH  2,254,199
CUTTING IMPLEMENT
Filed Sept. 28, 1939
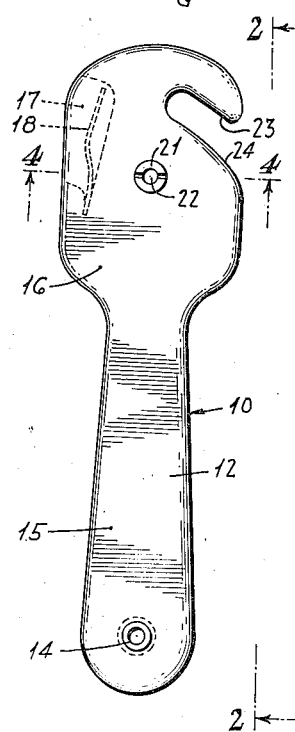
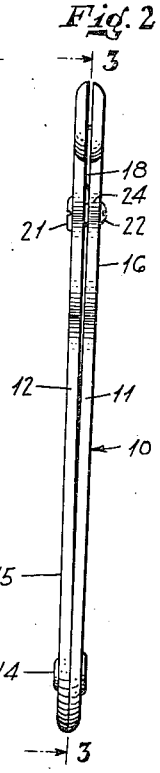
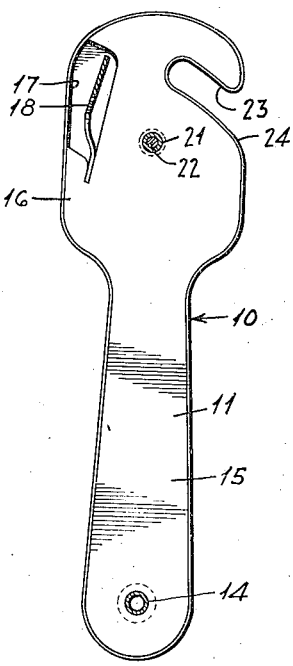
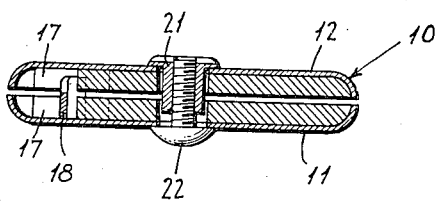
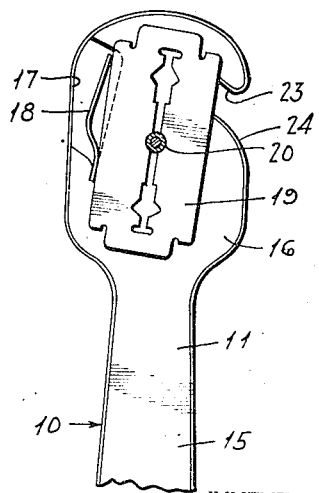
INVENTOR.
DAVID BALTUCH
BY Richards & Geier
ATTORNEYS

UNITED STATES PATENT OFFICE 2,254,199

CUTTING IMPLEMENT

David Baltuch, Brooklyn, N. Y.

Application September 28, 1939, Serial No. 296,903

2 Claims. (Cl. 30—289)

This invention relates to a cutting implement and the like and, more particularly, to a cutting implement adapted for cutting twine, cord and the like.

One of the primary objects of the invention is to provide a cutting implement of the character indicated that will easily sever the material and which can be manipulated without danger of injury to the user.

Another object of the invention is to provide a cutting implement that will grip and hold the material to be severed before the actual severing takes place.

A further object is to provide a cutting implement in which the cutting blade or knife blade may be easily replaced when it becomes dull.

Still a further object is to provide a cutting implement in which the cutting blade or knife blade is protected against damage and guarded to prevent injury to the user but which still is ready for immediate use without any manual manipulation.

Other objects and advantages inherent in the invention will become apparent from the following specification taken in conjunction with the accompanying drawing illustrating a preferred embodiment of the invention. It will be understood, however, that the illustration is by way of example only and the invention may find expression within the scope of the appended claims.

In the drawing:

Figure 1 is a front elevation of a cutting implement according to the invention, Figure 2 is a side elevation taken along the line 2—2 of Figure 1, Figure 3 is a section taken along the line 3—3 of Figure 2, Figure 4 is a view taken along the line 4—4 of Figure 1, and Figure 5 is a fragmentary section similar to Figure 2 showing the cutting blade in position.

Referring in greater detail to the drawing:

The cutting implement comprises a holder generally indicated at 10. This holder consists of two halves, 11 and 12, which are pivoted together at one end at 14. In this manner, the two halves may be swung open to permit access to the interior.

The holder 10 is provided with a handle portion 15 and a head 16. Each half, 11 and 12, of the holder is provided with a registering recess 17. In one of these recesses is mounted the leaf spring 18 which is of such a height that it will project above the flat surface of the half on which it is mounted and into the registering recess of the opposite holder half.

A thin cutting blade, such as a razor blade 19, is pivoted within the head 16 at 20. The pivot pin for the razor blade is preferably an interiorly screw-threaded bushing 21 inserted through one half of the holder and a screw 22 inserted from the other half and adapted to engage the screw-threads of the bushing 21. Thus the bushing 21 and the screw 22 besides serving as a pivot for the razor blade 19 will also hold the two halves 11 and 12 together.

The razor blade 19 abuts against the leaf spring 18; thus the razor blade 19 can be pushed further into the head against the resistance of the spring 18.

Each half of the head 16 is provided with a registering oblique slot or recess 23. Normally the razor blade is entirely covered by the head 16 and only a portion of the blade and the edge will be visible in the slot 23. The slot 23 is so constructed that the cord, twine or similar material can be accommodated therein.

The slot 23 runs preferably on the bias towards the handle portion 15 and one side thereof is preferably rounded at 24, so that the cord or similar material will easily slip into the slot when the cutting implement is pulled across the cord or twine.

It will be understood from the foregoing explanation that the edge of the blade 19 will move across the slot 23 when the cord presses it backwards against the spring 18. This transverse movement across the slot naturally will facilitate the severing operation.

The head 16 of the holder may be slightly hollowed out to accommodate the cutting blade 19, but it will be understood that because of the thinness of the blade no special slot has to be provided. The degree of friction between the blade and the two halves may simply be adjusted by means of the spring 22.

It will be observed that the blade 19 is entirely protected within the head 16 and that the material can be severed only upon entrance into the slot 23. The leaf spring 18 is so adjusted that the edge of the blade 19 will normally be spaced from the exterior edge of the head as shown in Figure 5 of the drawing.

Having thus described the invention, the following is claimed:

1. A cutting implement comprising a holder, a transverse slot in said holder, a cutting blade carried by said holder having a cutting edge extending across said slot, said cutting blade being resiliently pivoted at one side of said slot whereby said cutting edge will move across said slot at a progressively increasing angle upon contact with the material to be severed.

2. A cutting implement comprising a holder and a handle, a transverse slot in said holder extending obliquely away from said handle, a cutting blade having a cutting edge extending across said slot, said cutting blade being resiliently pivoted adjacent to the handle side of said slot whereby said cutting edge will be swung into said slot upon contact with the material to be severed.

DAVID BALTUCH.